(12) United States Patent
Yoshida

(10) Patent No.: US 6,529,231 B1
(45) Date of Patent: Mar. 4, 2003

(54) TELEVISION MEETING SYSTEM

(75) Inventor: Isao Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/568,249

(22) Filed: May 10, 2000

(30) Foreign Application Priority Data

May 12, 1999 (JP) .......................................... 11-130986

(51) Int. Cl.⁷ ................................................. H04N 7/14
(52) U.S. Cl. ................................ 348/14.08; 348/14.09; 379/93.21
(58) Field of Search ........................... 348/14.01, 14.02, 348/14.03, 14.04, 14.05, 14.06, 14.07, 14.08, 14.09; 370/260, 261; 345/330; H04N 7/14

(56) References Cited

U.S. PATENT DOCUMENTS 5,638,114 A * 6/1997 Hatanaka et al. ......... 348/14.08

FOREIGN PATENT DOCUMENTS

| GB | 2337654 A | 11/1999 | | |
|---|---|---|---|---|
| JP | 62-149287 | 7/1987 | | |
| JP | 62-149287 A | 7/1987 | | |
| JP | 62149287 | 7/1987 | | |
| JP | 3-49385 A | 3/1991 | | |
| JP | 5-91407 A | 4/1993 | | |
| JP | 5-91504 | 4/1993 | | |
| JP | 6-165173 A | 6/1994 | | |
| JP | 6319130 | 11/1994 | | |
| JP | 407212735 A | * 8/1995 | ............ | H04N/7/15 |
| JP | 7-250312 A | 9/1995 | | |
| JP | 8307845 | 11/1996 | | |
| JP | 9130799 | 5/1997 | | |
| JP | 9-233443 A | 9/1997 | | |
| JP | 10-13799 | 1/1998 | | |
| JP | 10-13799 A | 1/1998 | | |
| JP | 1013799 | 1/1998 | | |
| JP | 410210437 A | * 8/1998 | ............ | H04N/7/10 |
| WO | WO9739581 | 10/1997 | | |

* cited by examiner

Primary Examiner—Melur Ramakrishnaiah
(74) Attorney, Agent, or Firm—Young & Thompson

(57) ABSTRACT

In a television meeting system, image data and voice data are transmitted and received among a plurality of terminal units. The terminal unit transmits and receives a video signal synthesized by combining desired background data selected by a user with taken-out image and voice. The terminal unit includes a recorder in which desired background data selected by the user is preliminarily recorded.

7 Claims, 6 Drawing Sheets

TELEVISION MEETING SYSTEM

BACKGROUND OF THE INVENTION

The present invention relates to television meeting systems.

Japanese Patent No. 10-13799 shows an prior art television meeting system. As shown in FIG. 5 which is a block diagram showing the construction of the television telephone system disclosed therein, the illustrated prior art television telephone system comprises a camera 26, a transmitting unit 25 including a background extractor 27, an image data compressor 28 and a data synthesizer 29, a receiving unit 32 including a data demultiplexer 33, an image data expander 34, an image synthesizer 35 and a background data memory 36, a monitor 37 and communication lines 30 and 31.

The prior art television telephone set having the above construction operates as follows.

In the transmitting unit 25, the background extractor 27 splits an image picked up by the camera 26 into matrix array blocks, and sorts out the blocks into subject blocks more pronounced in inter-frame movement and background blocks less pronounced in inter-frame movement. The data synthesizer 29 feeds out a signal for discriminating the subject blocks and the background blocks from one another together with a compressed image signal of the subject block to the communication line 30. In the receiving unit 32, upon reception of the data of this type from the communication line, the image data expander 34 expands the compressed image signal of the subject blocks, and the image synthesizer 35 assigns a particular pattern signal to the background blocks. The monitor 37, to which a signal synthesized from the image signal of the subject blocks and the background pattern of the background blocks is supplied, clearly reproduces the image of the subject blocks, i.e., the image of a person, while displaying the image of the background blocks in the particular pattern.

Japanese Patent Laid-Open No. 62-149287 shows a prior art video transmitting system. FIG. 6 is a block diagram showing the construction of the disclosed video transmitting system.

In this video transmitting system, as shown in the Figure, a video signal of video of a meeting room picked up by a television camera 38 and a video signal of background video stored in a background video out putting means 39 are inputted to a chromachy unit 40. The chromachy unit 40 separates the subject scene video and actual background video from the video of the meeting room with separating means, generates a cutting-out signal, cuts out the background video, and inserts the subject scene video in the background video. Subsequently, the chromachy unit 40 feeds out the video signal with subject scene video inserted in the background video to a television meeting unit 41. The video signal is then inputted via a communication circuit 42 and an opposite party station television meeting unit 43 to a monitor 44.

The system disclosed in the Japanese Patent Laid-Open No. 10-13799 has the following problems.

A first problem is that this system synthesizes a particular pattern as the background image, and does not synthesize any desired motion picture image. This is so because the compressed data blocks are for providing a discrimination signal and irrelevant to actual image synthesis.

A second problem is that the system can not permit synthesis unless it is supported by the receiving side terminal unit. This is so because, like the case of the first problem, it is not possible to synthesize any pattern unless the discrimination signal can be understood.

The system disclosed in Japanese Patent Laid-Open No. 62-149287 has the following problem.

A first problem is that the actual background image of scene object video should be used for chromachy. This is so because of the use of the chromachy unit as image separating/synthesizing means.

A second problem is that the use of a background memory in the terminal unit as means for accumulating background video data poses limitation on the kinds of data.

SUMMARY OF THE INVENTION

The present invention was made in view of the above problems in the prior art, and it has an object of providing a television meeting system, which permits a desired image selected by the user of the television meeting system to be used as background for meeting.

According to a first aspect of the present invention, there is provided a television meeting system in which image data and voice data are transmitted and received among a plurality of terminal units, wherein the terminal unit transmits and receives a video signal synthesized by combining desired background data selected by a user with taken-out image and voice.

The terminal unit includes a recorder in which desired background data selected by the user is preliminarily recorded. The terminal unit is connected to a data server for obtaining the desired background data selected by the user from the data server. The terminal unit obtains the desired background data selected by the user from the opposite side terminal unit. The terminal unit uses the image and voice taken out by each terminal unit itself as the desired background data selected by the user. The terminal unit compresses and multiplexes the video signal for transmission.

According to another aspect of the present invention, there is provided a terminal unit in the television meeting system according to the above structure.

According to other aspect of the present invention, there is provided a television meeting system in which image data and voice data are transmitted and received among a plurality of terminal units, the terminal unit comprising:
  a camera for taking out motion picture image data;
  a microphone for taking out voice data;
  a monitor for displaying the motion picture image data;
  a loud-speaker for reproducing the voice data;
  a keyboard for taking out data selection data;
  an image data synthesizer for synthesizing the image data;
  a voice data synthesizer for synthesizing the voice data;
  a data recorder for recording the received voice and image data;
  a data controller for selecting the image data and voice data to be combined from the data received;
  a compressor for compressing the voice and image data;
  an expander for expanding the compressed voice and image data;
  a multiplexer for multiplexing the compressed voice and image data, and delivering the compressed data as communication data;
  a demultiplexer for demultiplexing or separating the received communication data into voice data and motion picture image data; and a communicator for sending out and receiving the communication data to and from the opposite side terminal unit, wherein the data controller extracts the selected data among the data recorded in the data recorder according to the received data selection data, and delivers the extracted data to the image data synthesizer and the voice data synthesizer, the image data synthesizer synthesizes the data by combining the image data extracted from the data recorder as background with user s image data taken out from the camera, the voice data synthesizer synthesizes data from user's voice data taken out from the microphone and voice data extracted from the data recorder, and delivers the synthesized data to the compressor, the compressor compresses the received image and voice data, and delivers the compressed data to the multiplexer, the multiplexer multiplexes the compressed image and voice data as the communication data, and delivers this communication data to the communicator, and the communicator transmits the received communication data via the communication line.

In the above system, the communicator receives communication data from the opposite side terminal unit via the communication line, and delivers the received data to the demultiplexer, the demultiplexer separates the received communication data into image data and voice data, and delivers the separated data to the expander, the expander expands the received motion picture image data and voice data, and delivers the motion picture image data to the monitor, eceiving the motion picture image data, the monitor displays the image, the expander delivers the expanded voice data to the loud-speaker, and receiving the voice data, the loud-speaker outputs the voice.

A plurality of terminal units defined in claim 1 are connected by a communication line to a data server, and when no data complying with the data selection data is present in the data recorder of the terminal unit, the data controller causes transfer of complying data from the data server via the communicator and the communication line to the data recorder.

During the television meeting operation or when the image and voice data are being received via the communication line, the image and voice data being received is accumulated in the data recorder 9 by the user s selection, and the data accumulated in the above operation is used as the background data.

Other objects and features will be clarified from the following description with reference to attached drawings.

PREFERRED EMBODIMENTS OF THE INVENTION

Preferred embodiments of the present invention will now be described with reference to the drawings.

In the television meeting system according to the present invention, the user of a terminal unit can synthesize an image from a desired image inserted in the own background and cause the synthesized image to be displayed in a terminal unit on the opposite side of the communication.

Figure 1:
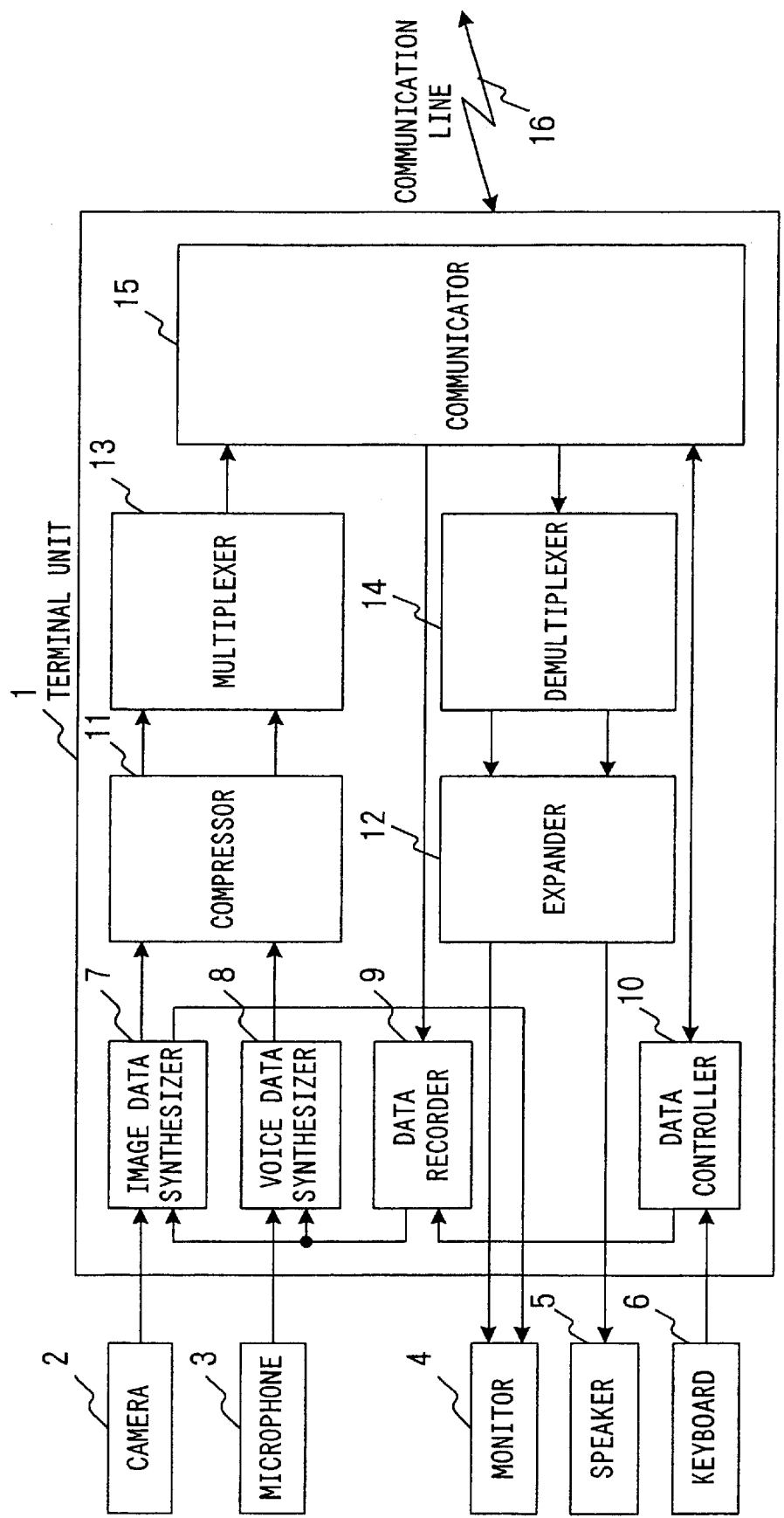
FIG. 1 is a block diagram showing a first embodiment of the television meeting system according to the present invention.

FIG. 1 is a block diagram showing a first embodiment of the television meeting system according to the present invention.

Referring to FIG. 1, the user inputs data selection data as desired to provide the background of the own image from a keyboard 6 of terminal unit 1. Receiving the user's data selection data, a data controller 10 selects data complying with the data selection data, and delivers the selected data to an image synthesizer 7 and a voice synthesizer 8. The synthesizers 7 and 8 synthesize image and voice data from the user's image and voice data inputted from a camera 2 and a microphone 3, respectively, by inserting image and voice data received from a data recorder as background, then compresses and multiplexes the synthesized data, and then delivers the resultant multiplexed data to a communicator 15. The multiplexed data is sent out via a communication line 16 to the terminal unit on the opposite side of the communication.

Figure 2:
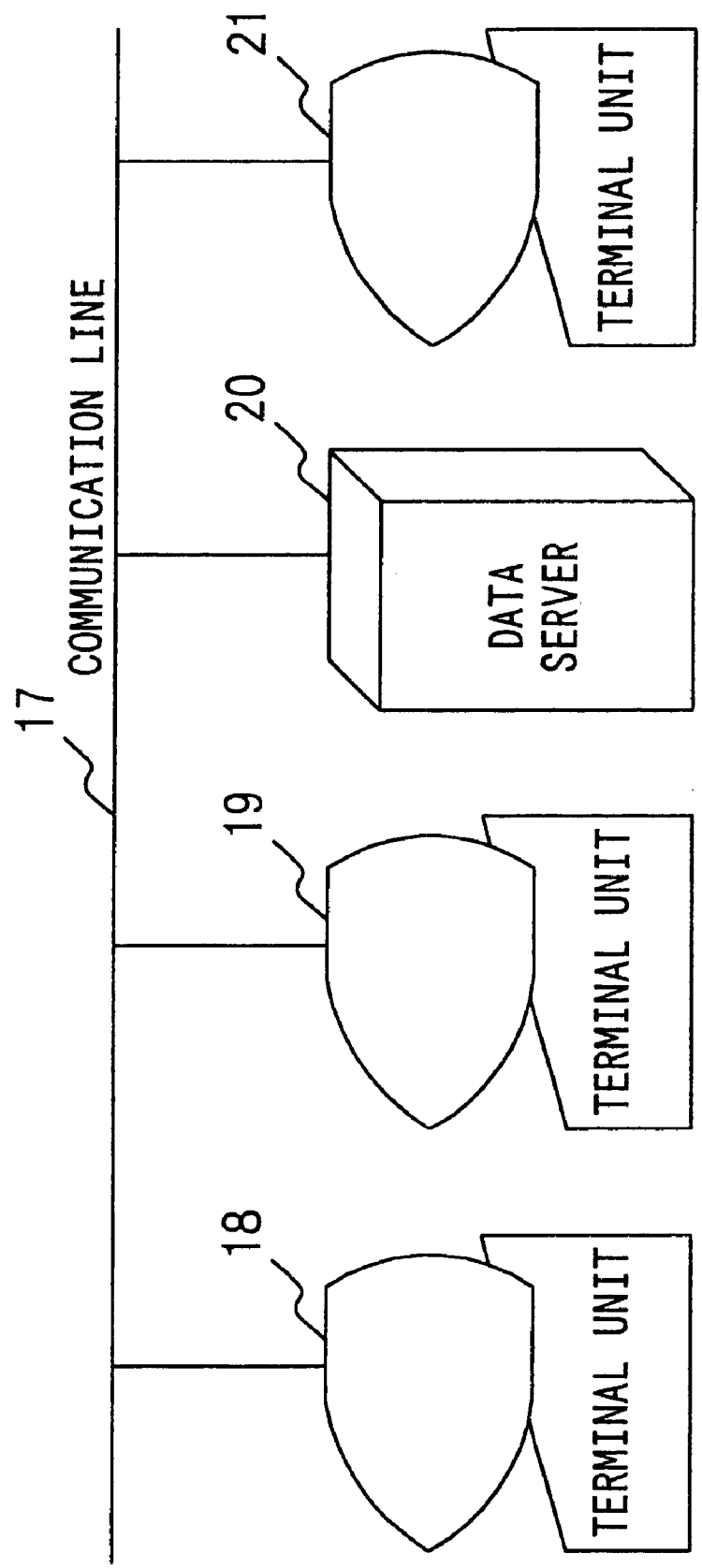
FIG. 2 shows the connection constitution in a second embodiment of the present invention.

The terminal unit receiving the multiplexed data from the terminal unit on the opposite side of the communication, executes processes of separating and expanding data. A monitor 4 reproduces the image data, and a loudspeaker 5 reproduces the voice data. When no data complying with the user's data selection data is present in the data recorder 9 in the terminal unit 1, as shown in FIG. 2, background data is received from a data server 20 via a communication line 17. The received background data is recorded in the data recorder 9, and used as such. According to the user's selection, it is also possible to use the image and voice data received via the communication line 16 as background data by accumulating the received data in the data recorder 9.

As shown above, according to the present invention it is possible to use a desired image selected by the user for the television meeting communication.

Referring again to FIG. 1, the first embodiment of the television meeting system according to the present invention includes a terminal unit 1 and a communication line 16.

The terminal unit 1 comprises a camera 2, a microphone 3, a monitor 4, a loudspeaker 5, a keyboard 6, an image data synthesizer 7, a voice data synthesizer 8, a data recorder 9, a data controller 10, a compressor 11, an expander 12, a multiplexer 13, a demultiplexer 14 and a communicator 15.

The individual components operate as follows.

The camera 2 takes out the motion picture image data. The microphone 3 takes out the voice data. The monitor 4 displays the motion picture image data. The loud-speaker 5 reproduces the voice data. The keyboard 6 is an input device for taking out data selection data from the user.

The image data synthesizer 7 synthesizes the image data. The voice data synthesizer 8 synthesizes the voice data. The data recorder 9 records the received voice and image data. The data controller 10 selects the image data and voice data to be combined from the data received from the user.

The compressor 11 compresses the voice and image data. The expander 12 expands the compressed voice and image data. The multiplexer 13 multiplexes the compressed voice and image data, and delivers the compressed data as communication data to the communicator 15. The demultiplexer 14 demultiplexes or separates the received communication data into voice data and motion picture image data.

The communicator 15 sends out and receives the communication data to and from the opposite side terminal unit. Data are transmitted and received along the communication line 16 between the terminal units.

As user's data in the television meeting system, the motion picture image data is inputted from the cameras 2 of the terminal unit 1, the voice data is inputted from the microphone 3, and the data selection data is inputted from the keyboard 6.

Now, the operation of the embodiment will be described in detail with reference to FIGS. 1 and 4.

Figure 4:
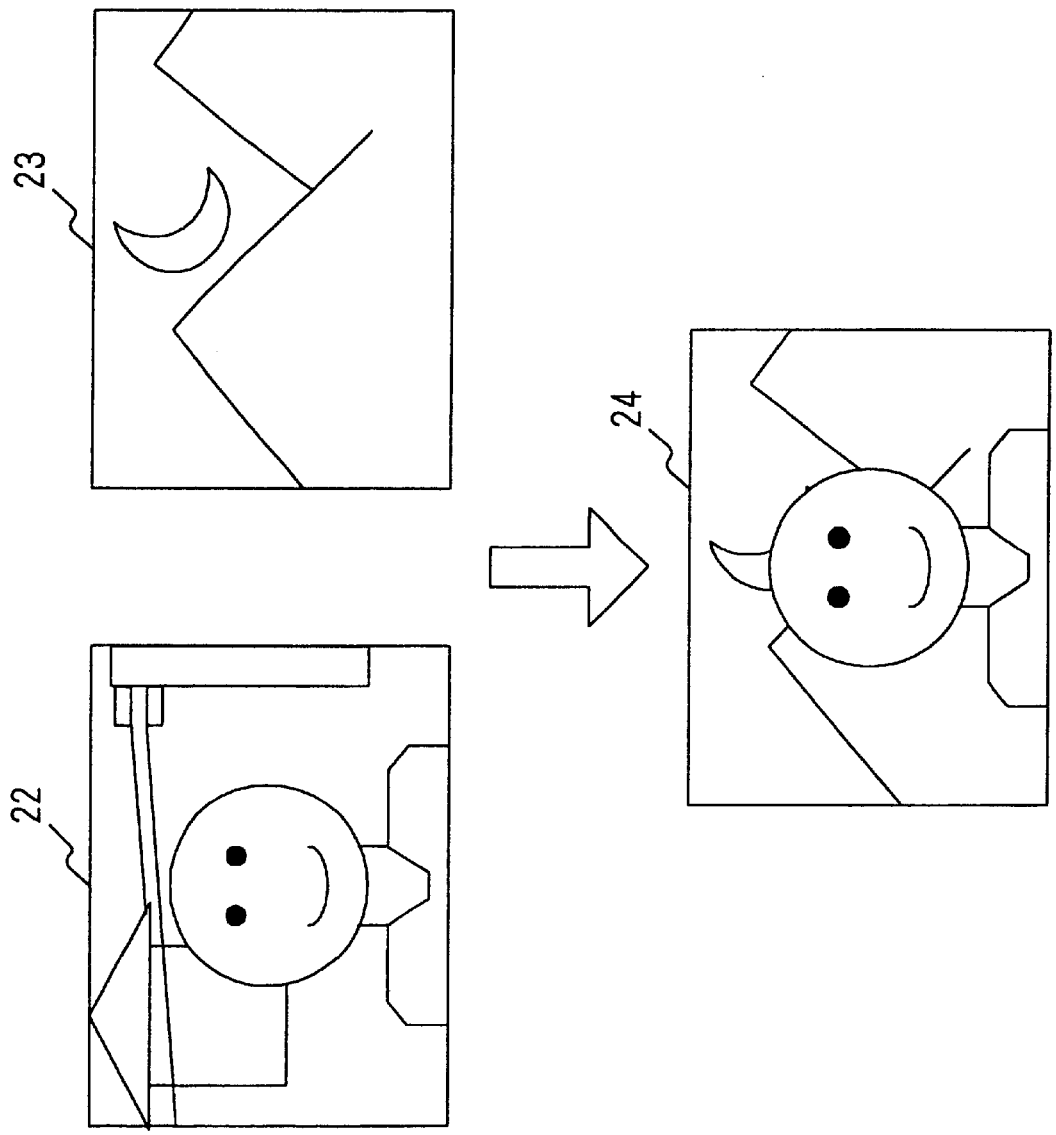
FIG. 4 shows an example of image synthesis in the first embodiment of the present invention.
Figure 5:
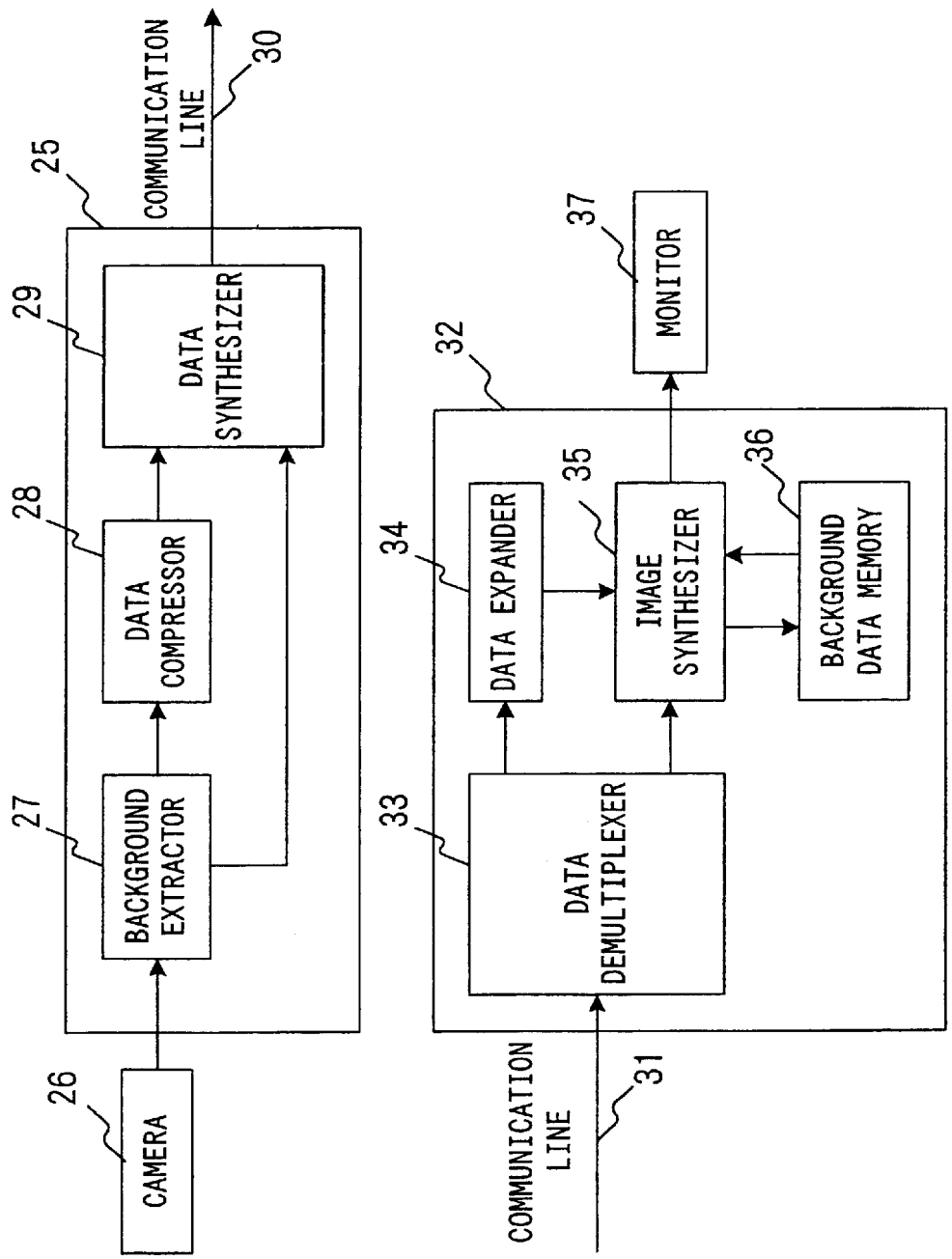
FIG. 5 is a block diagram showing the construction of a prior art television telephone system.
Figure 6:
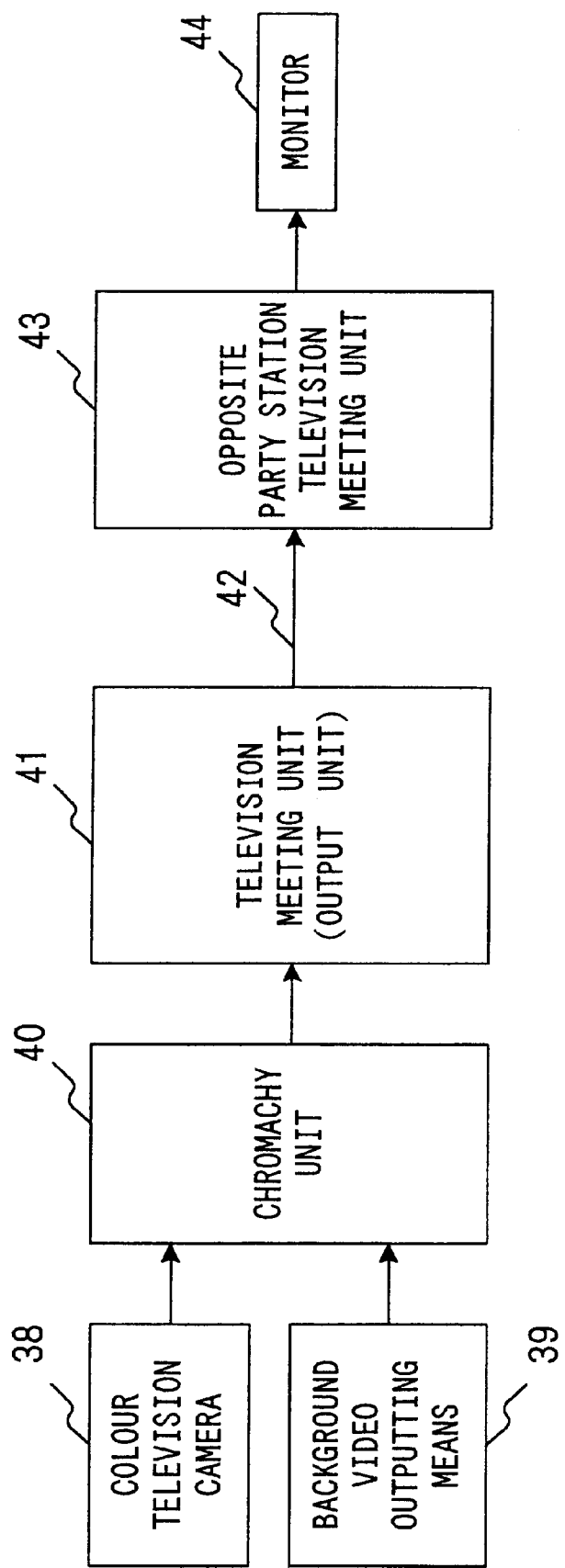
FIG. 6 is a block diagram showing the construction of another prior art television telephone system.

FIG. 4 shows an example of image synthesis in the embodiment. The data controller 10 extracts the selected data among the data recorded in the data recorder 9 according to the received data selection data, and delivers the extracted data to the image data synthesizer 7 and the voice data synthesizer 8.

The image data synthesizer 7 synthesizes the data by combining the image data extracted from the data recorder 9 as background with user's image data taken out from the camera 2, as shown in FIG. 4. In FIG. 4, reference numeral 22 designates user's image data taken out from the camera 2, numeral 23 image data extracted from the data recorder 9, and numeral 24 image data synthesized in the image data synthesizer.

The voice data synthesizer 8 synthesizes data from user's voice data taken out from the microphone 3 and voice data extracted from the data recorder 9, and delivers the synthesized data to the compressor 11. The compressor 11 compresses the received image and voice data, and delivers the compressed data to the multiplexer 13. The multiplexer 13 multiplexes the compressed image and voice data as the communication data, and delivers this communication data to the communicator 15. The communicator 15 transmits the received communication data via the communication line 16.

The operation in case when the terminal unit 1 receives data will now be described. The communicator 15 receives communication data from the opposite side terminal unit via the communication line 16, and delivers the received data to the demultiplexer 14. The demultiplexer 14 separates the received communication data into image data and voice data, and delivers the separated data to the expander 12. The expander 12 expands the received motion picture image data and voice data, and delivers the motion picture image data to the monitor 4. Receiving the motion picture image data, the monitor 4 displays the image. The expander 12 also delivers the expanded voice data to the loud-speaker 5. Receiving the voice data, the loud-speaker 5 outputs the voice. In the above way, both motion picture image and voice are reproduced.

A second embodiment of the present invention will now be described with reference to FIG. 2 representing the connection constitution in this embodiment. In this embodiment, terminal units 18, 19 and 21, which are the same as the terminal unit 1 shown in FIG. 1, are connected by a communication line 17 to a data server 20.

When no data complying with the data selection data inputted from the keyboard 6 is present in the data recorder 9 of the terminal unit 1, the data controller 10 causes transfer of complying data from the data server 2, shown in FIG. 2, via the communicator 15 and the communication line 16 to the data recorder 9.

Figure 3:
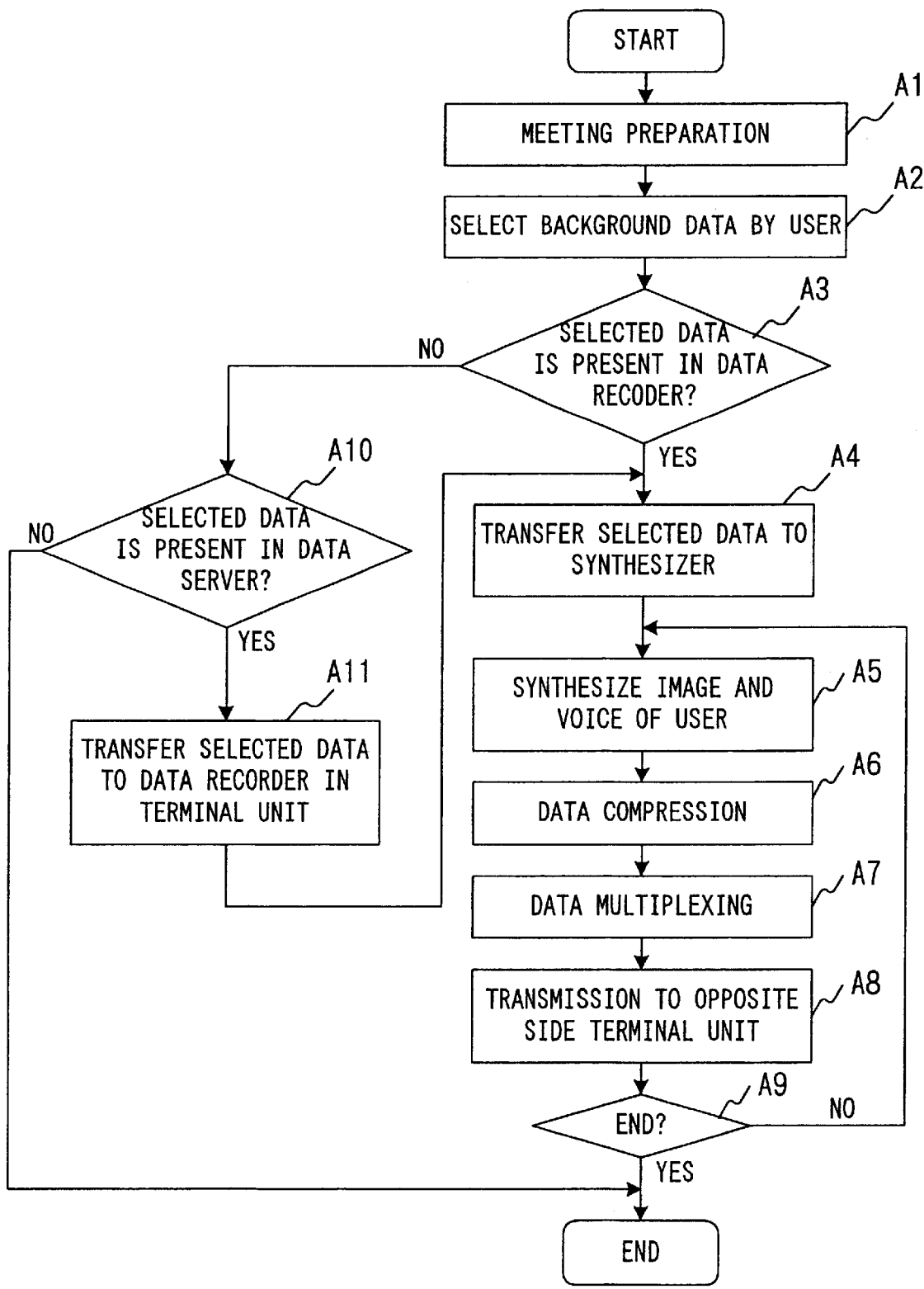
FIG. 3 is a flow chart for describing the operation of the second embodiment of the present invention.

FIG. 3 is a flow chart for describing the operation of this embodiment.

After meeting preparations such as power-"on" of the television meeting system (step A1), the user selects the background data by operating the keyboard 6 (step A2).

The data controller 10 then checks whether the background data selected by the user is present in the data recorder 9 (step A3). When the background data selected by the user is not present in the data recorder 9, the data controller 10 accesses the data server 20 shown in FIG. 2, and checks whether the background data selected by the user is present in the data server 20 (step A10).

When it is not determined in the step A10 that the background data selected by the user is not present in the data server 20, the data controller 10 brings an end to the process sequence. When it is determined that the background data selected by the user is present in the data server 20, the data controller 10 causes transfer of that data to the data recorder 9 (step A11).

When it is determined in the step A3 that the background data selected by the user is present in the data recorder 9, and also when the background data selected by the user is transferred in the step A11, the data controller 10 causes transfer of the selected data to the image data synthesizer 7 and also to the voice data synthesizer 8 (step A4).

The image and voice data synthesizers 7 and 8 synthesize the data by combining the data inputted from the camera 2 and the microphone 3 and the background data selected by the user (step A5). The synthesized data are compressed in the compressor 11 (step A6), then multiplexed in the multiplexer (A7), and then transmitted from the communicator 15 to the opposite side terminal unit (step A8). Subsequently, the process is continued until the end of meeting (step A9).

As described above, in this embodiment, the data complying with the data selection data is present in the data recorder 9, and like the above first embodiment it is possible to combine the background data when synthesizing data.

A third embodiment of the present invention will now be described. In this embodiment, during the television meeting operation or when the image and voice data are being received via the communication line 16 by the user's operation, the image and voice data being received can be accumulated in the data recorder 9 by the user's selection.

The data accumulated in the above operation can be used as background data when synthesizing data in a circumstance that data is selected by the data controller 10.

Furthermore, it is possible to permit image and voice data, having been taken by the camera 2 and the microphone 3 of the terminal unit 1 itself to be accumulated in the data recorder 9 and subsequently used as background data.

A first effect of the present invention is that a desired image selected by the user of the television meeting terminal unit can be used as the background for the meeting. This is so because image data extracted from the data recorder of the data server is combined and transmitted as background data.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A television meeting system in which image data and voice data are transmitted and received among a plurality of terminal units, the terminal unit comprising:
- a camera for taking out motion picture image data;
- a microphone for taking out voice data;
- a monitor for displaying the motion picture image data;
- a loud-speaker for reproducing the voice data;
- a keyboard for taking out data selection data;
- an image data synthesizer for synthesizing the image data;
- a voice data synthesizer for synthesizing the voice data;
- a data recorder for recording the received voice and image data;
- a data controller for selecting the image data and voice data to be combined from the data received;
- a compressor for compressing the voice and image data;
- an expander for expanding the compressed voice and image data;
- a multiplexer for multiplexing the compressed voice and image data, and delivering the compressed data as communication data;
- a separator for separating the received communication data into voice data and motion picture image data; and
- a communicator for sending out and receiving the communication data to and from the opposite side terminal unit, wherein the data controller extracts the selected data among the data recorded in the data recorder according to the received data selection data, and delivers the extracted data to the image data synthesizer and the voice data synthesizer, the image data synthesizer synthesizes the data by combining the image data extracted from the data recorder as background with user's image data taken out from the camera, the voice data synthesizer synthesizes data from user's voice data taken out from the microphone, and delivers the synthesized data to the compressor, the compressor compresses the received image and voice data, and delivers the compressed data to the multiplexer, the multiplexer multiplexes the compressed image and voice data as the communication data, and delivers this communication data to the communicator, and the communicator transmits the received communication data via the communication line a plurality of terminal units are connected by a communication line to a data server, and when no data complying with the data selection data is present in the data recorder of the terminal unit, the data controller causes transfer of complying data from the data server via the communicator and the communication line to the data recorder.

2. The television meeting system according to claim 1, wherein the communicator receives communication data from the opposite side terminal unit via the communication line, and delivers the received data to demultiplexer, the demultiplexer separates the received communication data into image data and voice data, and delivers the separated data to the expander, the expander expands the received motion picture image data and voice data, and delivers the motion picture image data to the monitor, receiving the motion picture image data, the monitor displays the image, the expander delivers the expanded voice data to the loud-speaker, and receiving the voice data, the loud-speaker outputs the voice.

3. The television meeting system according to claim 1, wherein during the television meeting operation or when the image and voice data are being received via the communication line, the image and voice data being received is accumulated in the data recorder 9 by the user's selection, and the data accumulated in the above operation is used as the background data.

4. A television meeting system in which image data and voice data are transmitted and received among a plurality of terminal units, the terminal unit comprising:
- a video input for receiving motion picture image data;
- an audio input for receiving voice data;
- a video output for displaying the motion picture image data;
- an audio output for outputting the voice data;
- a selection device;
- an image data synthesizer for synthesizing the image data;
- a voice data synthesizer for synthesizing the voice data;
- a data recorder for recording the received voice and image data;
- a data controller for selecting the image data and voice data to be combined from the data received;
- a compressor for compressing the voice and image data;
- an expander for expanding the compressed voice and image data;
- a multiplexer for multiplexing the compressed voice and image data, and delivering the compressed data as communication data;
- a separator for separating the received communication data into voice data and motion picture image data; and
- a communicator for sending out and receiving the communication data to and from an opposite side terminal unit, wherein the data controller extracts the selected data among the data recorded in the data recorder according to the received data selection data, and delivers the extracted data to the image data synthesizer and the voice data synthesizer, the image data synthesizer synthesizes the data by combining the image data extracted from the data recorder as background with user's image data connected to the video input, the voice data synthesizer synthesizes data from user's voice data taken out from a microphone connected to the audio input, and delivers the synthesized data to the compressor, the compressor compresses the received image and voice data, and delivers the compressed data to the multiplexer, the multiplexer multiplexes the compressed image and voice data as the communication data, and delivers this communication data to the communicator, the communicator transmits the received communication data via the communication line a plurality of terminal units are connected by a communication line to a data server, and when no data complying with the data selection data is present in the data recorder of the terminal unit, the data controller causes transfer of complying data from the data server via the communicator and the communication line to the data recorder.

5. The television meeting system according to claim 4, wherein the communicator receives communication data from the opposite side terminal unit via the communication line, and delivers the received data to demultiplexer, the demultiplexer separates the received communication data into image data and voice data, and delivers the separated data to the expander, the expander expands the received motion picture image data and voice data, and delivers the motion picture image data via the video output to a monitor, receiving the motion picture image data, the monitor displays the image, the expander delivers the expanded voice data to a loud-speaker connected to the audio output, and receiving the voice data, the loud-speaker outputs the voice.

6. The television meeting system according to claim 4, wherein during the television meeting operation or when the image and voice data are being received via the communication line, the image and voice data being received is accumulated in the data recorder by the user's selection, and the data accumulated is used as the background data.

7. A television meeting system in which image data and voice data are transmitted and received among a plurality of terminal units, the terminal unit comprising:
  a video input for receiving motion picture image data;
  an audio input for receiving voice data;
  a video output for displaying the motion picture image data;
  an audio output for outputting the voice data;
  a selection device;
  an image data synthesizer for synthesizing the image data;
  a voice data synthesizer for synthesizing the voice data;
  a data recorder for recording the received voice and image data;
  a data controller for selecting the image data and voice data to be combined from the data received;
  a compressor for compressing the voice and image data;
  an expander for expanding the compressed voice and image data;
  a multiplexer for multiplexing the compressed voice and image data, and delivering the compressed data as communication data;
  a separator for separating the received communication data into voice data and motion picture image data; and
  a communicator for sending out and receiving the communication data to and from an opposite side terminal unit, wherein
  a plurality of terminal units are connected by a communication line to a data server, and
when no data complying with the data selection data is present in the data recorder of the terminal unit, the data controller causes transfer of complying data from the data server via the communicator and the communication line to the data recorder.

* * * * *